United States Patent
Kanan

(10) Patent No.: US 7,275,127 B2
(45) Date of Patent: Sep. 25, 2007

(54) MULTI-APPLICATION TRANSPONDER CIRCUIT AND MEMORY MANAGEMENT METHOD FOR THE SAME

(75) Inventor: Riad Kanan, Marin (CH)

(73) Assignee: EM Microelectronic-Marin SA, Marin (CH)

( * ) Notice: Subject to any disclaimer, the term of this patent is extended or adjusted under 35 U.S.C. 154(b) by 374 days.

(21) Appl. No.: 10/888,953

(22) Filed: Jul. 12, 2004

(65) Prior Publication Data

US 2005/0040244 A1 Feb. 24, 2005

(30) Foreign Application Priority Data

Jul. 14, 2003 (EP) .................... 03015964

(51) Int. Cl.
*G06F 12/00* (2006.01)
(52) U.S. Cl. ............... 711/103; 711/102; 711/156
(58) Field of Classification Search .............. None
See application file for complete search history.

(56) References Cited

U.S. PATENT DOCUMENTS

| | | |
|---|---|---|
| 4,930,129 A | 5/1990 | Takahira |
| 5,276,903 A | 1/1994 | Shinagawa |
| 5,339,400 A | 8/1994 | Iijima |
| 5,384,749 A | 1/1995 | Lisart et al. |
| 6,608,548 B1 * | 8/2003 | Pellaton et al. ............ 340/5.54 |
| 6,829,675 B2 * | 12/2004 | Maeda et al. ............... 711/103 |

FOREIGN PATENT DOCUMENTS

| | | |
|---|---|---|
| EP | 1113387 A2 | 7/2001 |
| WO | WO97/34265 | 9/1997 |
| WO | WO 02/35464 A2 | 5/2002 |

OTHER PUBLICATIONS

European Search Report, completed Dec. 10, 2003.

* cited by examiner

*Primary Examiner*—Reginald Bragdon
*Assistant Examiner*—Ngoc Dinh
(74) *Attorney, Agent, or Firm*—Griffin & Szipl, P.C.

(57) ABSTRACT

There is disclosed a multi-application transponder circuit for a contactless electronic identification and/or access system including, in particular, a non-volatile memory (18) having a segmented programmable memory space for receiving data relating to a plurality of distinct applications, this memory space including (i) a first memory zone (A) segmented into several memory words each dedicated to storage of data relating to a determined application from among said plurality of distinct applications, (ii) a second memory zone (B), called a shared zone, segmented into several memory words each able to be allocated to storage of data relating to any application from among said plurality of distinct applications, and (iii) a third memory zone (C) containing indications relating to the allocation of memory words of said second memory zone, at least, and for determining which memory word or words of said second memory zone are allocated to storage of data relating to a given application from among said plurality of distinct applications. There is also disclosed a memory management method for such a transponder circuit.

13 Claims, 6 Drawing Sheets

Fig. 4

| WORDS | MEMORY SEGMENT 1 | | MEMORY SEGMENT 2 | | ... | MEMORY SEGMENT N | | | | |
|---|---|---|---|---|---|---|---|---|---|---|
| | X | X+1 | X+2 | X+3 | ... | X+i | X+i+1 | X+j | X+j+1 | ... | X+j+n-1 |
| Application 1 | 1 | 1 | 0 | 0 | ... | 0 | 0 | 1 | 0 | ... | 0 |
| Application 2 | 0 | 0 | 1 | 1 | ... | 0 | 0 | 0 | 0 | ... | 0 |
| ... | ... | ... | ... | ... | ... | ... | ... | ... | ... | ... | ... |
| Application N | 0 | 0 | 0 | 0 | ... | 1 | 1 | 0 | 1 | ... | 0 |
| Occupation | 1 | 1 | 1 | 1 | ... | 1 | 1 | 1 | 1 | ... | 0 |

MEMORY ZONE A — MEMORY ZONE B

MULTI-APPLICATION TRANSPONDER CIRCUIT AND MEMORY MANAGEMENT METHOD FOR THE SAME

FIELD OF THE INVENTION

The present invention generally concerns the field of transponder circuits for contactless electronic identification and/or access systems. More specifically, the present invention concerns a so-called multi-application transponder circuit of this type adapted to allow storage of data relating to a plurality of distinct applications as well as a memory management method for such a transponder circuit.

BACKGROUND TO THE INVENTION

Multi-application transponder circuits for contactless electronic identification and/or access systems are already known. WO Patent Nos. 97/34265 and 02/35464 for example disclose solutions where the memory space of the transponder circuit is segmented into a plurality of memory segments for each receiving data relating to a determined application from among a plurality of distinct applications. WO Patent No. 97/34265 offers a solution where the segmentation of memory space is carried out as a function of the quantity of data to be stored, each memory segment having a variable length. Headings are also available for identifying each of the memory segments and their allocation to the application concerned. WO Patent No. 02/35464 has a solution adopting a more rigid organisation of the memory space available in the transponder circuit, a plurality of memory segments being predefined to each receive data relating to a determined application from among a plurality of distinct applications. With respect to the solution disclosed in WO Patent No. 97/34265, this solution offers the advantage of simplifying, to a very large extent, addressing of the memory words and the memory read and write operations. This solution, however, has the drawback of a non-upgradeable and not very flexible memory structure.

One constraint of transponder circuits for contactless electronic identification and/or access systems lies in the relatively limited resources that it is possible or that one could consider incorporating therein. It is in particular desirable to propose inexpensive solutions to implement, which do not weigh too heavily on the manufacturing costs of the transponder circuit. High capacity memories and developed file systems, as encountered particularly in the field of computer science, are unfortunately not suited for use in transponder circuits of the aforementioned type, not only because of the implementation costs thereof, but also because of the high calculation power required to operate such solutions. Moreover, in the case of transponder circuits of the passive type where the energy necessary to power these circuits is directly derived from a low frequency electromagnetic field (typically 125 kHz) produced by the associated interrogation device, the low working frequency is not suited to implementation of a developed memory architecture, since the latter is too demanding in terms of processing time.

It is thus desirable to propose a multi-application transponder circuit whose memory architecture offers more flexibility than the prior solutions having a rigid memory organisation like that disclosed in WO Patent No. 02/35464 while taking care not to over-burden or make the memory architecture too complex. It is an object of the present invention to offer such a solution.

SUMMARY OF THE INVENTION

The present invention thus concerns first of all a multi-application transponder circuit whose features are listed in independent claim 1.

Advantageous embodiments of this transponder circuit form the subject of the dependent claims.

The present invention also concerns a memory management method for a transponder circuit of the aforementioned type whose main features are listed in claim 8.

BRIEF DESCRIPTION OF THE DRAWINGS

Other features and advantages of the present invention will appear more clearly upon reading the following detailed description of embodiments of the invention given solely by way of non-limiting example and illustrated by the annexed drawings, in which:

FIG. 4 is an illustration detailing further the organisation of the data of the third memory zone of FIG. 3, this third memory zone being preferably organised in the form of a correspondence table between the memory words of the first and second memory zones and the various applications.

EMBODIMENTS OF THE INVENTION

Figure 1:
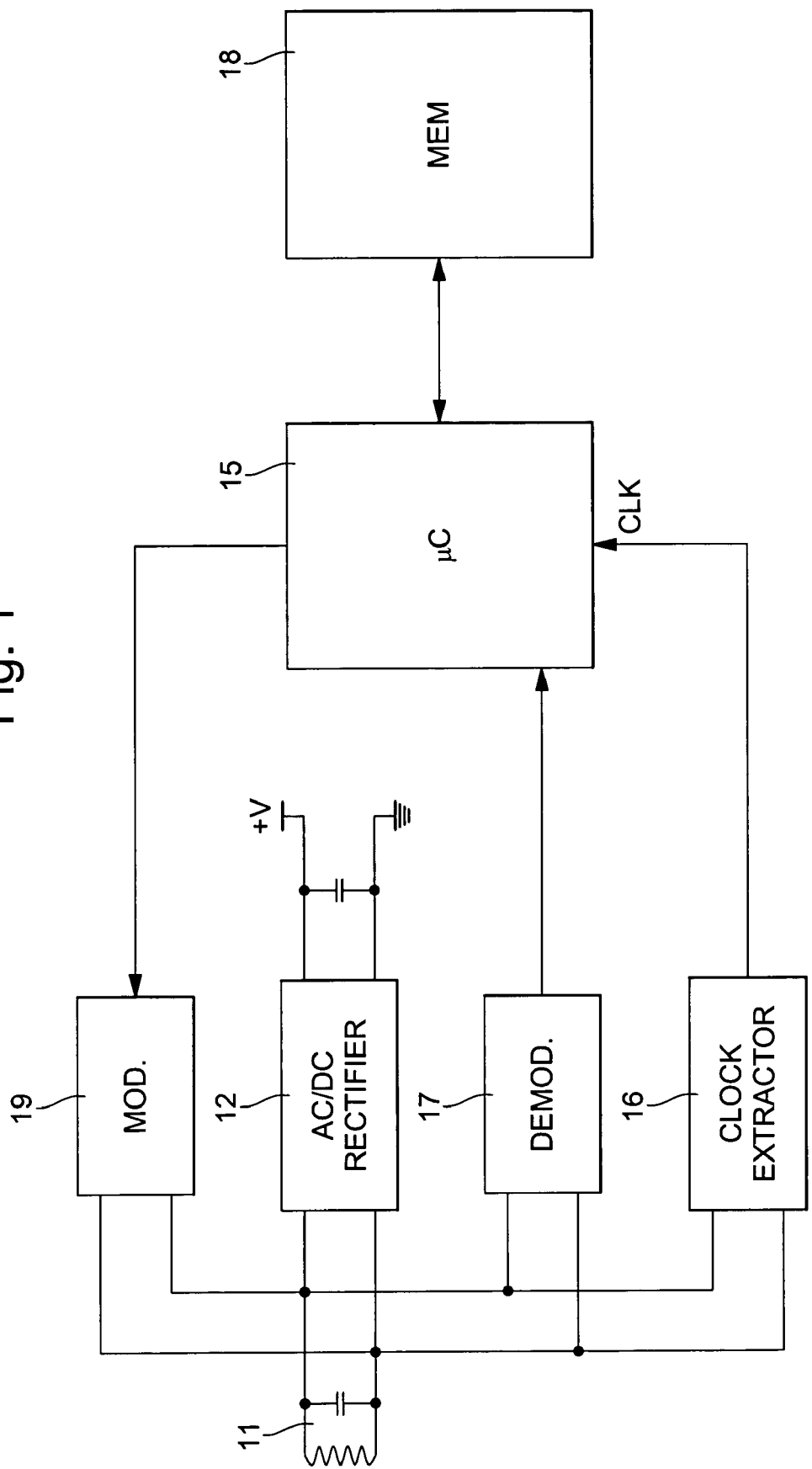
FIG. 1 shows a block diagram of a transponder circuit of the passive type forming an embodiment of the invention.

FIG. 1 shows a block diagram of a transponder circuit for a contactless electronic identification and/or access system according to an embodiment of the invention. This transponder, typically arranged to operate at a frequency of the order of 125 kHz, is particularly arranged for cooperating with an external interrogation device that is not shown, via an inductive type contactless interface. The transponder circuit of FIG. 1 is powered by the ambient electromagnetic field produced by the interrogation device, a field that induces a voltage across the terminals of a coil 11 of a circuit forming an antenna. This voltage is rectified by an AC/DC rectifier unit 12 and supplies the supply voltage +V necessary for the transponder circuit to operate. The transponder further includes clock extraction means 16 for deriving, from the electromagnetic field, a clock signal (CLK) for clocking a control logic 15, and demodulation means 17 for extracting modulated data from the electromagnetic field picked up by the antenna. The transponder circuit further includes storage means 18, formed particularly and preferably by a re-programmable memory (e.g. an EEPROM) and a read-only memory (ROM). Finally, encoding and modulation means 19 for modulating and transmitting data stored in storage means 18.

Figure 2:
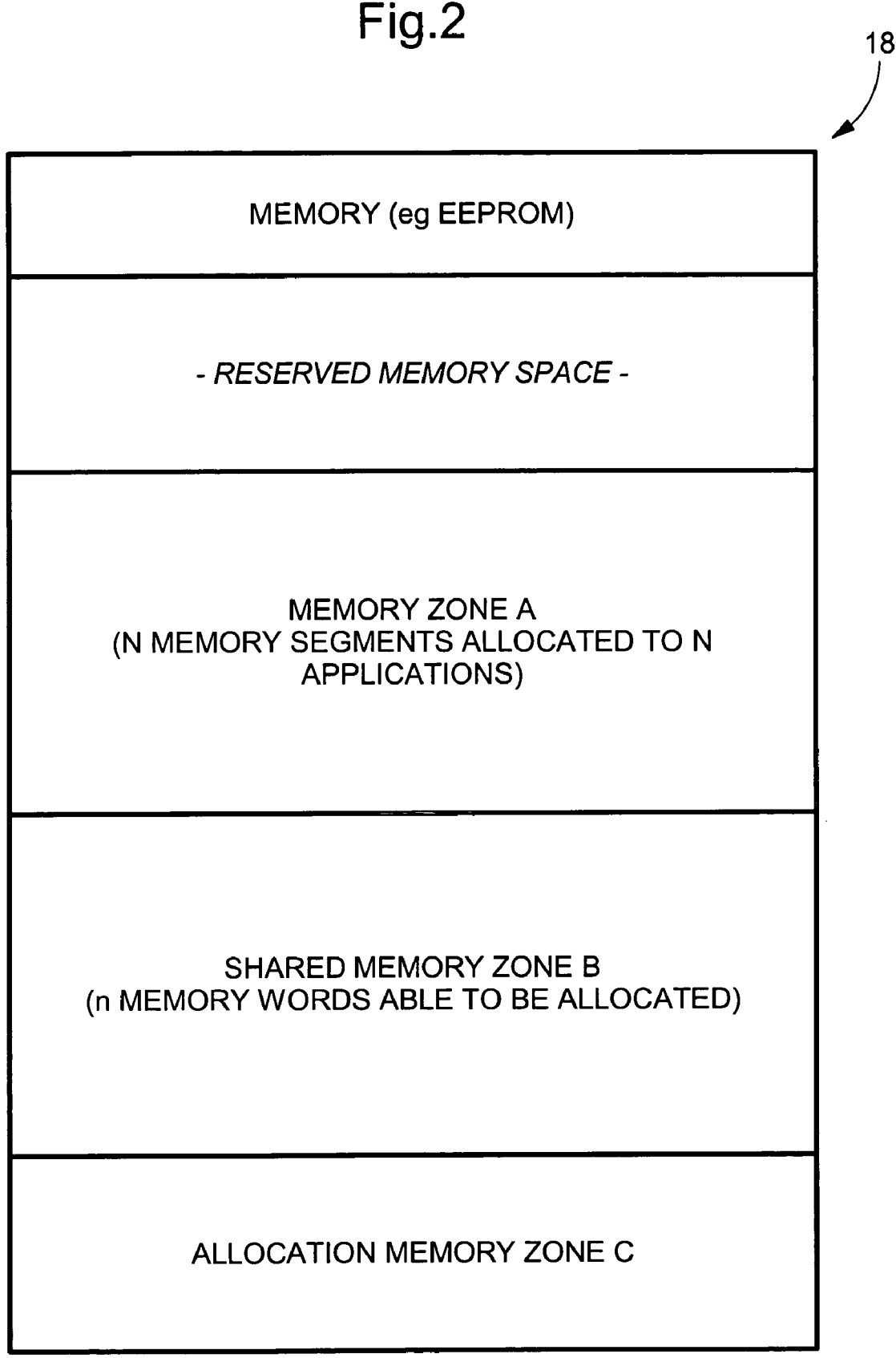
FIG. 2 schematically illustrates the overall organisation of the storage means of the transponder circuit of FIG. 1, which includes a first segmented and pre-established memory zone, a second so-called shared memory zone that is also segmented into several memory words and a third memory zone containing indications relating to the allocation, preferably, of memory words of the first and second memory zones.

FIG. 2 shows schematically the architecture and organisation of storage means 18 of the transponder circuit illustrated in FIG. 1. As already mentioned, these storage means 18 include, in particular, a re-programmable memory (advantageously an EEPROM). The re-programmable memory is organised into a plurality of memory words of determined length. Storage means 18 further include, in a non-limiting manner, additional words (not shown) laser programmed into a read-only memory (ROM). These ROM memory words typically contain a series number and an identification number that are unique to each transponder circuit.

A first part of the transponder circuit memory space (called the reserved space in FIG. 2) is allocated for the storage of data other than data relating to the various applications for which the transponder circuit is configured. This data can include passwords or control words or even keys used for encryption or decryption of stored data. The particular structure of this first reserved part of the memory space will not be described here, the latter having no direct link to the claimed subject of the invention.

Another part of the transponder circuit memory space is actually allocated to the storage of data relating to the various applications able to be stored in parallel in the transponder circuit. It is this second part of the memory space and its organisation that interests us more particularly.

Within the scope of the present invention, this part of the memory space is subdivided into three specific memory zones, which will now be described in detail. The first memory zone, designated by the reference A, is thus segmented into several memory words, each dedicated to the storage of data relating to a determined application from among the plurality of distinct applications for which the transponder circuit can be configured. More specifically, starting from the principle that transponder circuit storage means 18 arranged for simultaneously storing data relating to N distinct applications, the first memory zone A includes as many memory segments as there are applications, i.e. N memory segments. Each of these segments can include one or several memory words.

The second memory zone, designated by the reference B, is also segmented into several memory words. However, unlike the first memory zone A, the various memory words of zone B can be allocated to storage of data relating to any of the aforementioned N applications. In this regard, the second memory zone is called "shared" since each of the memory words of which it is formed can be allocated to any application from among the plurality of applications for which the transponder circuit is configured.

The third memory zone, called the allocation zone, designated by the reference C, does not actually allow storage of data relating to the applications. It assures and identifies only allocation of memory words from at least the second memory zone B (preferably both memory zones A and B), i.e. contains indications for determining which of the memory words of at least the second memory zone B are allocated to storage of application data and to which applications these memory words are allocated.

Third memory zone C does not necessarily contain indications relating to the allocation of memory words of the first memory zone A, given that each of the memory words of first zone A is dedicated to a determined application. However, in order to ensure and offer better flexibility of use, the third memory zone preferably contains allocation data for each of memory zones A and B. According to a preferred embodiment, a first part of third memory zone C identifies the allocation of memory words of memory zone A and a second part of the third memory zone identifies the allocation of memory words of the second memory zone B.

According to a particularly advantageous embodiment of the present invention, the allocation of memory words of the first memory zone is pre-established and stored accordingly in third memory zone C, for example during manufacture or configuration of the transponder circuit. The allocation of memory words of second memory zone B is variable as a function of the needs of each application and is capable of being updated by a user by modifying the indications stored in third memory zone C.

Figure 3:
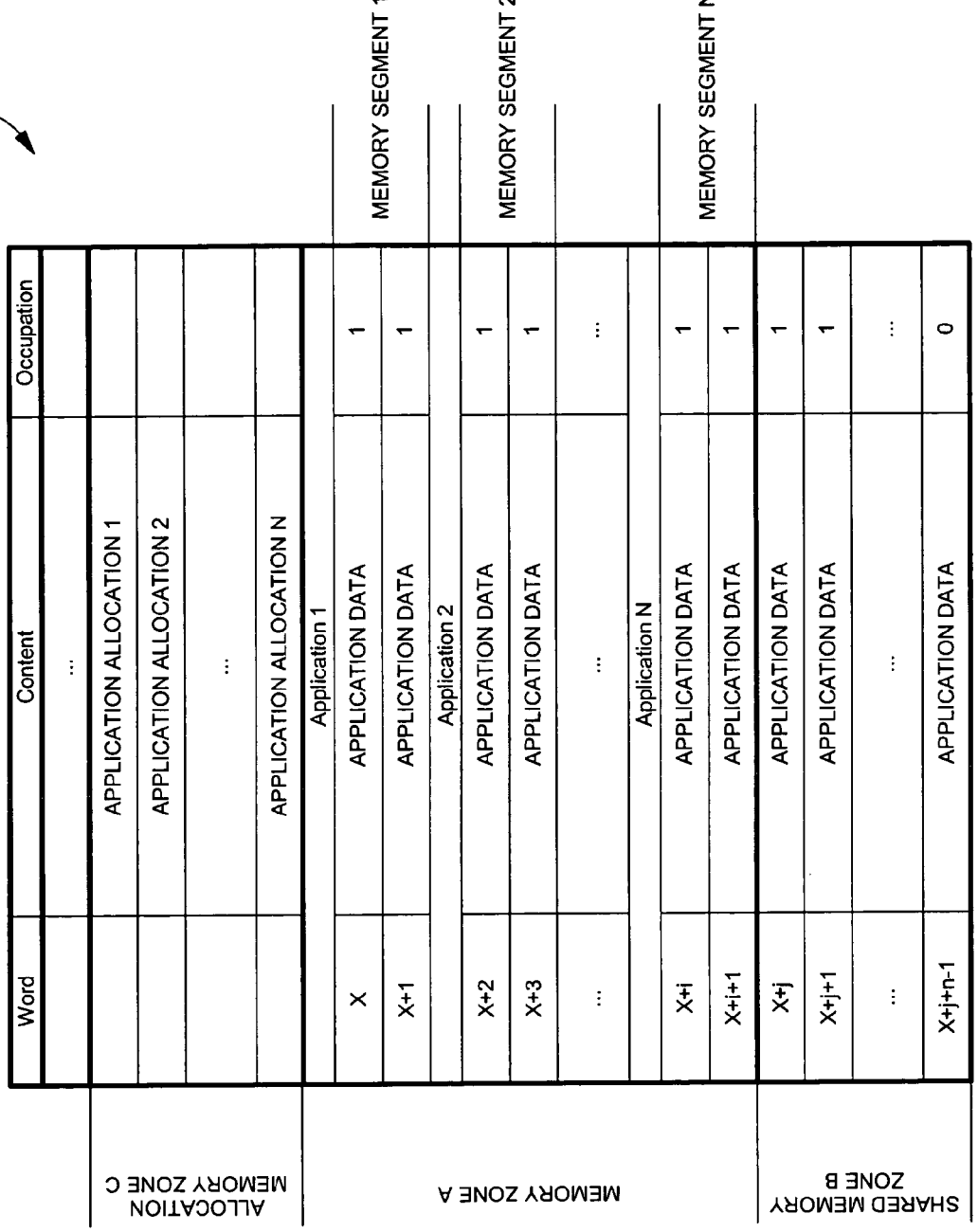
FIG. 3 illustrates in more detail the organisation of the storage means of FIG. 2 according to one embodiment of the invention.

It should be noted that the illustration of FIG. 2 must not be considered limitative, since the subdivision into the three aforementioned memory zones A, B and C is purely functional. Thus, the order of succession of memory zones and their distribution in FIG. 2 should not be considered limitative. FIG. 3 discussed hereinafter shows for example that allocation memory zone C can be moved upstream of memory zones A and B. It should be mentioned finally that memory zones A to C and the memory zones of which it is formed are not necessarily arranged contiguously.

FIG. 3 shows a more detailed illustration of the organisation of memory zones A to C according to one embodiment. Purely by way of illustration, the N memory segments forming memory zone A each include a pair of memory words designated X and X+1 (memory segment 1), X+2 and X+3 (memory segment 2) to X+i and X+i+1 (memory segment N). The second memory zone B is made up of n memory words designated X+j to X+j+n−1.

Allocation memory zone C is advantageously made up in this example of N allocation memory words (hereinafter "allocation words") identifying the allocation of the various memory words of zones A and B for each of the N applications. FIG. 4 shows an illustration of a possible structure of allocation memory zone C that again uses this subdivision into N allocation words.

As can be seen in FIG. 4, memory zone C is advantageously organised like a correspondence table including N lines corresponding to each of the N applications for which the transponder circuit is configured and including as many columns as there are memory words capable of being exploited in the first and second memory zones A and B, in this case the 2N+n memory words X to X+j+1 and X+j to X+j+n−1. In the example of FIG. 4, the correspondence table is thus made up of 2N+n columns and N lines.

It will be understood that each of the cells of the FIG. 4 table represents the allocation of the corresponding memory word to one of the N applications. Each allocation is identified here by an allocation bit whose value "0" or "1" respectively indicates, by convention, that the corresponding memory word is not allocated or is allocated to the associated application.

As already mentioned, allocation of the memory words of the first memory zone A is preferably pre-established. In the example of FIG. 4, the memory words of memory segments 1 to N of zone A are thus respectively pre-allocated to applications 1 to N as schematised by the values at "1" of the allocation bits concerned. Insofar as one of the applications requires more memory space, one or several memory words X+j to X+j+n−1 available in shared memory space B can be allocated to this application, in which case the allocation bit or bits concerned are set to "1". By way of example, FIG. 4 shows that the memory word X+j is allocated to application 1, whereas the memory word X+j+1 is allocated to application N.

One advantage of the structure illustrated in FIG. 4 lies in the fact that it is very easy to share one or more memory words between two or several applications. In fact, it is sufficient for all of the allocation bits of the memory word to pass to "1" for the applications concerned, in which case the column of the correspondence table for the memory word being considered will have several allocation bits at "1".

In addition to the aforementioned allocation bits, it is preferable to indicate the state of occupation ("used" or "empty") of each of the memory words of zones A and B by an associated occupation bit. In the example of FIG. 3, 2N+n bits are necessary to indicate the state of occupation of all of the memory words of zones A and B. By way of example, all of the occupation bits of the memory words of first memory zone A are at "1" thus indicating that these words contain data. However, only the occupation bits associated with words X+j and X+j+1 which are respectively allocated to applications 1 and N are at "1", the occupation bits of the other memory words of shared zone B all being at "0", thus indicating that they do not contain data. Like the allocation of memory words, the states of occupation of all of the memory words of zones A and B can be identified by one occupation word and be stored in this form in third memory zone C as illustrated by the additional line in the table of FIG. 4.

The joint use of allocation and occupation bits assures management of the memory space allocated to storage of application data as will now be illustrated by a certain number of examples.

Figure 5:
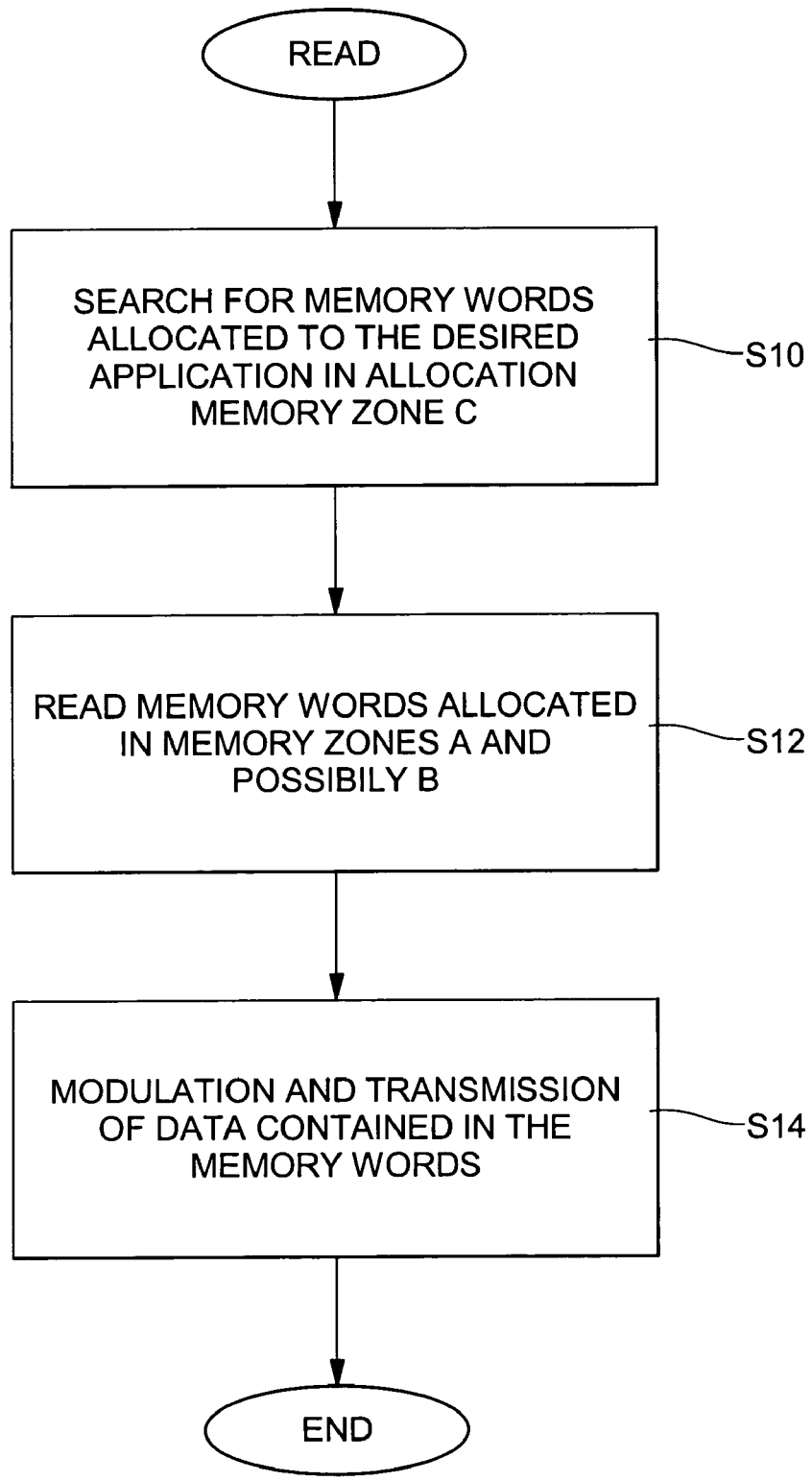
FIG. 5 is a flow diagram illustrating schematically a data read operation relative to an application.

FIG. 5 is a flow diagram illustrating schematically a data read operation relative to an application. This operation typically follows a read request transmitted by the external interrogation device. A first step designated S10 consists first of all in searching for the memory words allocated to the desired application in the allocation memory zone C. With reference to FIG. 4, this step consists in consulting the allocation word associated with the desired application in order to find the memory words allocated to this application. By way of example, assuming that one wished to read the date relating to application 1 in FIG. 4, this first step returns allocation of the three memory words X, X+1 and X+j.

The second step of the read process, designated S12, consists in reading the memory words allocated in memory zone A and, if necessary, in memory zone B. In the aforementioned example, consisting in reading data relating to application 1, this second step thus consists in reading memory words X and X+1 in memory zone A and reading additional memory word X+j in shared memory zone B. The final step of the read process, designated S14, consists in modulating and transmitting data contained in these memory words.

Figure 6:
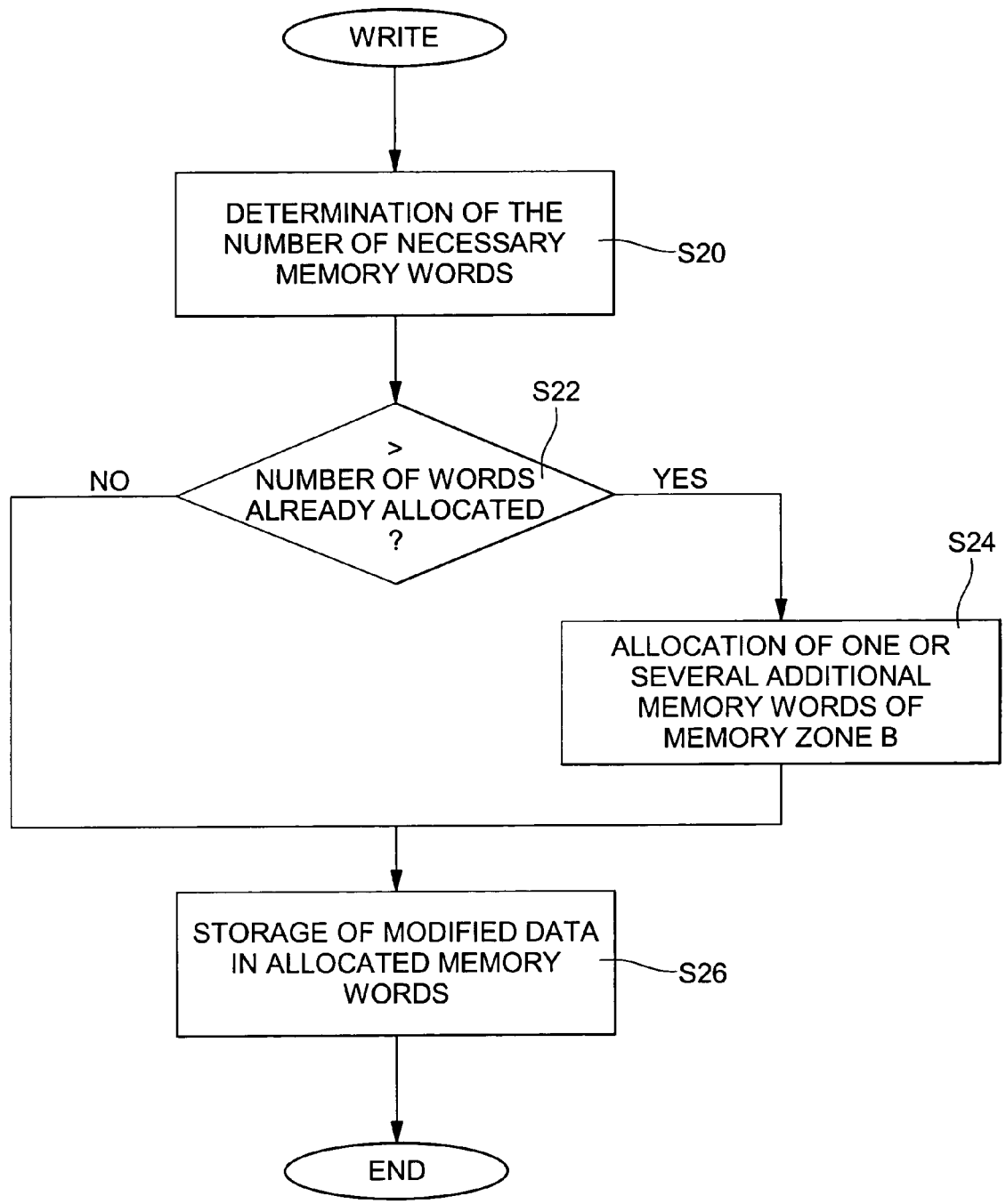
FIG. 6 is a flow diagram illustrating schematically a data storage operation relative to an application.

FIG. 6 is a flow diagram illustrating schematically a data storage operation relative to an application. This operation typically follows the transmission of modified data relating to the application concerned, by the external interrogation device. After reception of the modified data, the first step of the storage process, designated S20 in FIG. 6, consists in determining the number of memory words necessary for storing the modified data. This step S20 is followed by a check S22 for determining whether the memory space already allocated to the application has sufficient capacity to allow storage of the modified data. This check step S22 consists of a search for the memory words allocated to the desired application in allocation memory zone C (like step S10 of the read process illustrated in FIG. 5) and a comparison of the number of words already allocated with the number of words necessary for storing the modified data.

If the capacity is sufficient, at step S26, the modified data is stored directly in the memory words already allocated. In the opposite case, beforehand, at step S24, an allocation is carried out, for the application concerned, of one or several additional memory words of memory zone B. This allocation assumes a prior check of the number of free memory words in shared memory zone B (memory words having an associated occupation bit at "0"). This prior determination of the number of free memory words is preferably undertaken before data to be stored is transmitted to the transponder circuit so that data is not wastefully transmitted while the storage capacity is insufficient. This prior determination can simply consist in consulting the occupation bits of the memory words of zones A and B and counting all the memory words having an occupation bit at "0".

It will be understood that the consequence of allocating of one or several additional memory words is a modification in allocation memory zone C of the allocation bit or bits corresponding to the application and to the memory words concerned. Thus, by way of example, allocation of the additional memory word X+j to application 1 in FIGS. 3 and 4 passes through the passage of the corresponding allocation bit to "1" in the FIG. 4 table. If the data is stored at step S26 in a memory word newly allocated at step S24, it will be understood that the occupation bit corresponding to this additional memory word has also passed to "1".

A erasure operation of the data contained in a memory word involves the passage of the corresponding occupation bit to "0", whether this word belongs to the first or second memory zone A or B. During erasure of the data contained in a memory word of shared memory zone B, the corresponding allocation bit, for this application, has also passed to "0". As regards allocation of the memory words of memory zone A, a change in allocation is preferably only carried out if all of the data relating to the application has been erased. Thus, for example, in FIG. 4, if only the data contained in memory word X+3 of memory zone A has been erased whereas data is still present in the other memory word X+2 of the same memory segment, the allocation bit of word X+3 to application 2 is not modified. It is only in the event that all of the data relating to the application concerned is erased that the allocation bits of the associated memory words are passed to "0". From then on, these memory words are released to be allocated to another application or an already existing application.

Preferably, the change in allocation of the memory words of memory zone A, or erasure of the stored application data in this memory zone A, requires authorisation, for example by the owner of the application by means of a key peculiar to this application or a master key which has a right over all the applications. As regards memory zone B, however, as soon as a memory word of this zone has been erased, allocation of this memory word is also erased, this memory word then being able to be allocated again to another application.

The read, write and erasure applications are preferably managed by the transponder circuit itself so that management of the memory space is "invisible" from outside. The control logic of the transponder circuit (15 in FIG. 1) should thus be designed such that it can execute a certain number of pre-established commands. A read command with an application identification number (1 to N) as the only parameter could thus be defined, for example a command of the type "READ-APPLICATION appl-nbr" where the parameter appl-nbr identifies the desired application. Upon receiving such a read command, the transponder circuit would thus itself search for the stored data in order to transmit them to the external interrogation device. Likewise, a write command of the type "WRITE-APPLICATION appl-nbr ON x WORDS" could be defined, this command identifying only the application and the number of words necessary for storage of the data belonging to this application, for the transponder circuit then to manage the use of the memory space to carry out this operation. Other commands of this type could be envisaged.

It will be understood that various modifications and/or improvements evident to those skilled in the art can be made to the embodiments disclosed in the present description without departing from the scope of the invention defined by the annexed claims. In particular, the present invention is not limited solely to use in a passive type of transponder circuit as illustrated in FIG. 1.

What is claimed is:

1. A multi-application transponder circuit for a contactless electronic identification and/or access system including, in particular, a non-volatile memory having a segmented programmable memory space for receiving data relating to a plurality of distinct applications, the memory space including:
    a first memory zone segmented into several memory words each dedicated to storage of data relating to a determined application from among said plurality of distinct applications;
    a second memory zone, called a shared zone, segmented into several memory words each able to be allocated to storage of data relating to any application from among said plurality of distinct applications; and
    a third memory zone containing indications relating to the allocation of memory words of said second memory zone, at least, and for determining which memory word or words of said second memory zone are allocated to storage of data relating to a given application from among said plurality of distinct applications, wherein a first part of said third memory zone identifies the allocation of memory words of said first memory zone and wherein a second part of said third memory zone identifies the allocation of memory words of said second memory zone, and wherein the allocation of memory words of said first memory zone is pre-established and stored in said first part of the third memory zone and in that the allocation of memory words of the second memory zone is variable as a function of needs of each application and is capable of being updated by modifying the indications stored in said second part of the third memory zone.

2. The transponder circuit according to claim 1, wherein the allocation of a memory word to an application is determined by a single bit whose state indicates whether the memory word considered is or is not allocated to the corresponding application.

3. The transponder circuit according to claim 2, wherein said second memory zone includes n memory words each able to be allocated to storage of data relating to any application among said plurality of distinct applications, and wherein said third memory zone is organised such that for each application there is a corresponding allocation word including at least n bits each representative of the allocation to the application concerned of said n memory words of the second memory zone.

4. The transponder circuit according claim 1, wherein at least one of said memory words is shared between various applications.

5. The transponder circuit according to claim 1, wherein a state bit representative of an occupation or non-occupation of the memory word is associated with each memory word of said first and second memory zones.

6. In the transponder circuit according to claim 1, a memory management method for said transponder circuit the steps of including:
    a) during a read operation of data relating to a determined application from among said plurality of distinct applications;
        a search step in said third memory zone for the memory words of said second memory zone, at least, which are allocated to said determined application, and
    a step for reading in said first memory zone and, possibly in said second memory zone binary words allocated to said determined application,
    b) during a modified data storage operation relating to a determined application from among said plurality of distinct applications:
        a step for determining the number of memory words necessary for storing the modified data;
    if the number of memory words necessary for storing the modified data is less than or equal to the number of memory words already allocated to said determined application:
        a step for storing modified data in the memory words already allocated; or, in an opposite case:
        a step for allocating one or several memory words of said second memory zone to the determined application;
        a step for updating the allocation indications stored in said third memory zone; and
        a step for storing modified data in the allocated memory words of said first and second memory zones.

7. The method according to claim 6, includes, during an operation for erasing data contained in a memory word of said second memory zone which is allocated to a determined application from among said plurality of distinct applications:
    an erasure step, in said third memory zone, of the allocation indications relating to said memory word of the second memory zone such that this memory word can subsequently be allocated to another application from among said plurality of distinct applications.

8. The method according to claim 7, wherein the allocation indications relating to the memory words of said first memory zone, which are allocated to a determined application from among said plurality of distinct applications can only be erased from said third memory zone during an operating for erasing all of the data relating to said determined application.

9. The method according to claim 6, further includes, during an operation for storing data in a new memory word or during an operation for erasing all of the data contained in a memory word, a step for updating a state bit associated with the memory word concerned.

10. A memory management method for a multi-application transponder circuit for a contactless electronic identification and/or access system, including a non-volatile memory having a segmented programmable memory space for receiving data relating to a plurality of distinct applications, the memory space including:
    a first memory zone segmented into several memory words each dedicated to storage of data relating to a determined application from among said plurality of distinct applications;
    a second memory zone, called a shared zone, segmented into several memory words each able to be allocated to storage of data relating to any application from among said plurality of distinct applications; and a third memory zone containing indications relating to the allocation of memory words of said second memory zone, at least, and for determining which memory word or words of said second memory zone are allocated to storage of data relating to a given application from among said plurality of distinct applications; the memory management method for said transponder circuit including:

a) during a read operation of data relating to a determined application from among said pluarlity of distinct applications;

a search step in said third memory zone for the memory words of said second memory zone, at least, which are allocated to said determined application, and a step for reading in said first memory zone and, possibly in said second memory zone binary words allocated to said determined application;

b) during a modified data storage operation relating to a determined application from among said pluarlity of distinct applications:

a step for determining the number of memory words necessary for storing the modified data;

if the number of memory words necessary for storing the modified data is less than or equal to the number of memory words already allocated to said determined application:

a step for storing modified data in the memory words already allocated; or, in an opposite case:

a step for allocating one or several memory words of said second memory zone to the determined application;

a step for updating the allocation indications stored in said third memory zone; and a step for storing modified data in the allocated memory words of said first and second memory zones.

11. The method according to claim 10, includes, during an operation for erasing data contained in a memory word of said second memory zone which is allocated to a determined application from among said plurality of distinct applications:

an erasure step, in said third memory zone, of the allocation indications relating to said memory word of the second memory zone such that this memory word can subsequently be allocated to another application from among said plurality of distinct applications.

12. The method according to claim 11, wherein the allocation indications relating to the memory words of said first memory zone, which are allocated to a determined application from among said plurality of distinct applications can only be erased from said third memory zone during an operation for erasing all of the data relating to said determined application.

13. The method according to claim 10, further includes, during an operation for storing data in a new memory word or during an operation for erasing all of the data contained in a memory word, a step for updating the state bit associated with the memory word concerned.

* * * * *